United States Patent [19]
Fujii et al.

[11] Patent Number: 4,841,737
[45] Date of Patent: Jun. 27, 1989

[54] METHOD FOR CONTROLLING A DISPLACEMENT CHANGING MECHANISM OF A VARIABLE DISPLACEMENT REFRIGERANT COMPRESSOR FOR A CAR AIR-CONDITIONER

[75] Inventors: Toshiro Fujii; Shinichi Suzuki; Akira Nakamoto, all of Kariya, Japan

[73] Assignee: Kabushiki Kaisha Toyoda Jidoshokki Seisakusho, Aichi, Japan

[21] Appl. No.: 193,368

[22] Filed: May 12, 1988

[30] Foreign Application Priority Data

May 15, 1987 [JP] Japan ................. 62-119850

[51] Int. Cl.$^4$ .................. F25B 1/02; F04B 1/28
[52] U.S. Cl. ...................... 62/133; 62/227; 62/228.5; 417/53; 417/222
[58] Field of Search ........... 62/133, 227, 228.5; 417/222, 53

[56] References Cited

U.S. PATENT DOCUMENTS

| | | | |
|---|---|---|---|
| 4,510,764 | 4/1985 | Suzuki | 62/228.5 |
| 4,561,260 | 12/1985 | Nishi | 62/133 |
| 4,747,754 | 5/1988 | Fujii | 417/270 |
| 4,796,438 | 1/1989 | Sato | 62/228.5 |

FOREIGN PATENT DOCUMENTS

2153922 8/1985 United Kingdom ............. 417/222

Primary Examiner—William L. Freeh
Attorney, Agent, or Firm—Burgess, Ryan & Wayne

[57] ABSTRACT

A method for controlling the displacement changing mechanism of a variable displacement wobble plate type compressor arranged in a car air-conditioning circuit is carried out in a manner such that, when the operating condition of the compressor is stable and when hunting of a controlled variable of the air-conditioner, i.e., hunting of a temperature at the outlet end of an evaporator of the air-conditioning circuit, occurs, a manipulated variable to be given to the displacement changing mechanism to cause a change in the controlled variable is reduced so that hunting of the controlled variable is suppressed and the controlled variable reaches a desired value.

5 Claims, 6 Drawing Sheets

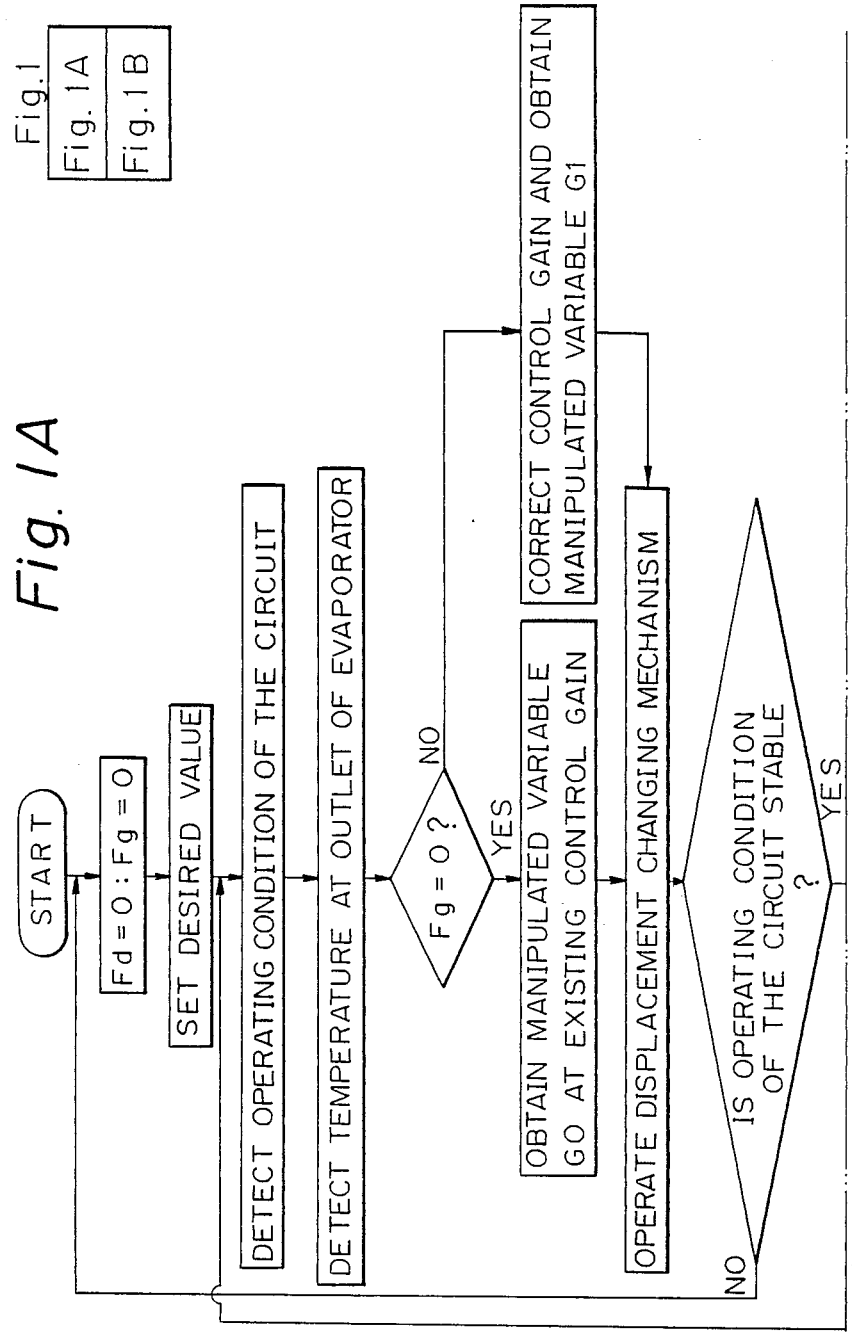

METHOD FOR CONTROLLING A DISPLACEMENT CHANGING MECHANISM OF A VARIABLE DISPLACEMENT REFRIGERANT COMPRESSOR FOR A CAR AIR-CONDITIONER

BACKGROUND OF THE INVENTION

1. Field of the Invention

The present invention relates to a method for controlling a variable displacement type refrigerant compressor employed for compressing a refrigerant of a car air-conditioner in relation to the closed circuit operation of the car air-conditioner having a closed refrigerant circuit incorporating therein a refrigerant condensor, an expansion valve, and an evaporator. More particularly, the invention relates to a method for controlling the operation of a displacement changing mechanism of a wobble plate type variable displacement compressor to prevent hunting of a controlled variable of an air-conditioner, which occurs when interference occurs between the controlled variable of the air-conditioner and a manipulated variable of a control means used for causing a change in the controlled variable by controlling the operation of the compressor, and to achieve the optimum operation of the variable displacement type compressor.

2. Description of the Related Art

Recent car air-conditioners are employing a variable displacement compressor for compressing a refrigerant gas medium, e.g., a variable displacement wobble plate type compressor, as disclosed in the allowed U.S. patent application Ser. No. 093,797 for the same Applicants. The variable displacement wobble plate type compressor is provided with a displacement changing mechanism to vary the compressor displacement, i.e., the delivery capacity of the compressor. For example, the displacement changing mechanism of the variable displacement wobble plate type compressor of the allowed U.S. patent application Ser. No. 093,797 comprises a solenoid valve means for changing the angularity of a wobble plate assembly in response to a requirement of the car air-conditioner, thereby increasing or decreasing the stroke of the pistons of the compressor.

As shown in FIG. 7, in the conventional method for controlling the operation of the variable displacement wobble plate type compressor especially used for a car air-conditioner having an evaporator as a heat exchanger, a desired value corresponding to a desired temperature in the compartment of a car is initially set at the start of the operation of the air-conditioner. Then, detection of the temperature of the outlet of the evaporator or that in the car compartment is carried out to detect a cooling load of the air-conditioner. Subsequently, calculation of a manipulated variable is carried out by an operating circuit for calculating the manipulated variable based on the desired temperature and the detected temperature at the outlet of the evaporator or in the car compartment to operate the displacement changing mechanism of the compressor. Accordingly, the operation of the variable displacement type refrigerant compressor is adjusted so that a controlled variable of the air-conditioner reaches an appropriate value.

Nevertheless, since the car air-conditioner has a closed refrigerant circuit in which the compressor, a refrigerant condenser, an expansion valve, and an evaporator are arranged and serially connected to one another, an adjustment of the displacement of the compressor carried out by the manipulated operation of the displacement changing mechanism of the compressor on the basis of the set desired temperature and the detected temperature at the evaporator outlet cannot cause an immediate reaction by the evaporator of the air-conditioner to regulate a controlled variable of the air-conditioner. Namely, a delay or a time lag appears between the manipulated operation of the compressor and the corresponding change in the controlled variable of the air-conditioner, and therefore, a hunting of the controlled variable oscillating up and down with respect to the desired temperature value occurs, and accordingly, a temperature at the outlet of the evaporator is greatly changed, which gives a passenger in the car compartment an uncomfortable feeling.

SUMMARY OF THE INVENTION

An object of the present invention is to obviate the afore-mentioned defect of the conventional controlling method for a variable displacement type refrigerant compressor of a car air-conditioner.

Another object of the present invention is to provide a method for controlling the operation of a variable displacement type refrigerant compressor of a car air-conditioner, which is able to suppress hunting of a controlled variable while keeping the operation of the compressor stable.

In accordance with the present invention, there is provided a method for controlling the operation of a variable displacement type refrigerant compressor provided with a displacement changing mechanism and arranged in a closed refrigerant circuit of a car air-conditioner including a refrigerant gas condensor connected to a delivery side of the compressor, an expansion valve connected to the refrigerant gas condensor, an evaporator connected to the expansion valve and to a suction side of the compressor, and a control means operatively connected to the displacement changing mechanism of the compressor for controlling the displacement changing mechanism, to thereby adjust a controlled variable of the car air-conditioner, which method comprises the steps of:

- detecting a physical variable indicating an operating condition of the air-conditioner;
- detecting a change in the controlled variable of the air-conditioner;
- determining whether or not the operating condition of the air-conditioner is stable on the basis of said detected physical variable;
- discriminating from the detected change in the controlled variable whether or not a hunting of the controlled variable occurs when the operating condition of the air-conditioner is stable; and
- adjusting a manipulated variable of the control means so that the operation of the displacement changing mechanism of the compressor is carried out to suppress the hunting of the controlled variable of the air-conditioner when the hunting of the controlled variable occurs.

The physical variable indicating an operating condition of the air-conditioner comprises a rotating number of the compressor, a temperature of the atmosphere of a car to be air-conditioned, the amount of sunshine coming into the car, a temperature at the inlet of the evaporator, and an electric voltage applied to a blower fan attached to the evaporator.

The controlled variable comprises a temperature of the refrigerant gas at the outlet of the evaporator or a temperature sensed in the compartment of a car or at the outlet of an air duct for delivering heat-exchanged air into the compartment of the car.

DESCRIPTION OF THE DRAWINGS

Other objects, features and advantages of the present invention will be made more apparent from the ensuing description of the preferred embodiments of the present invention with reference to the accompanying drawing wherein.

DESCRIPTION OF THE PREFERRED EMBODIMENTS

Figure 2:
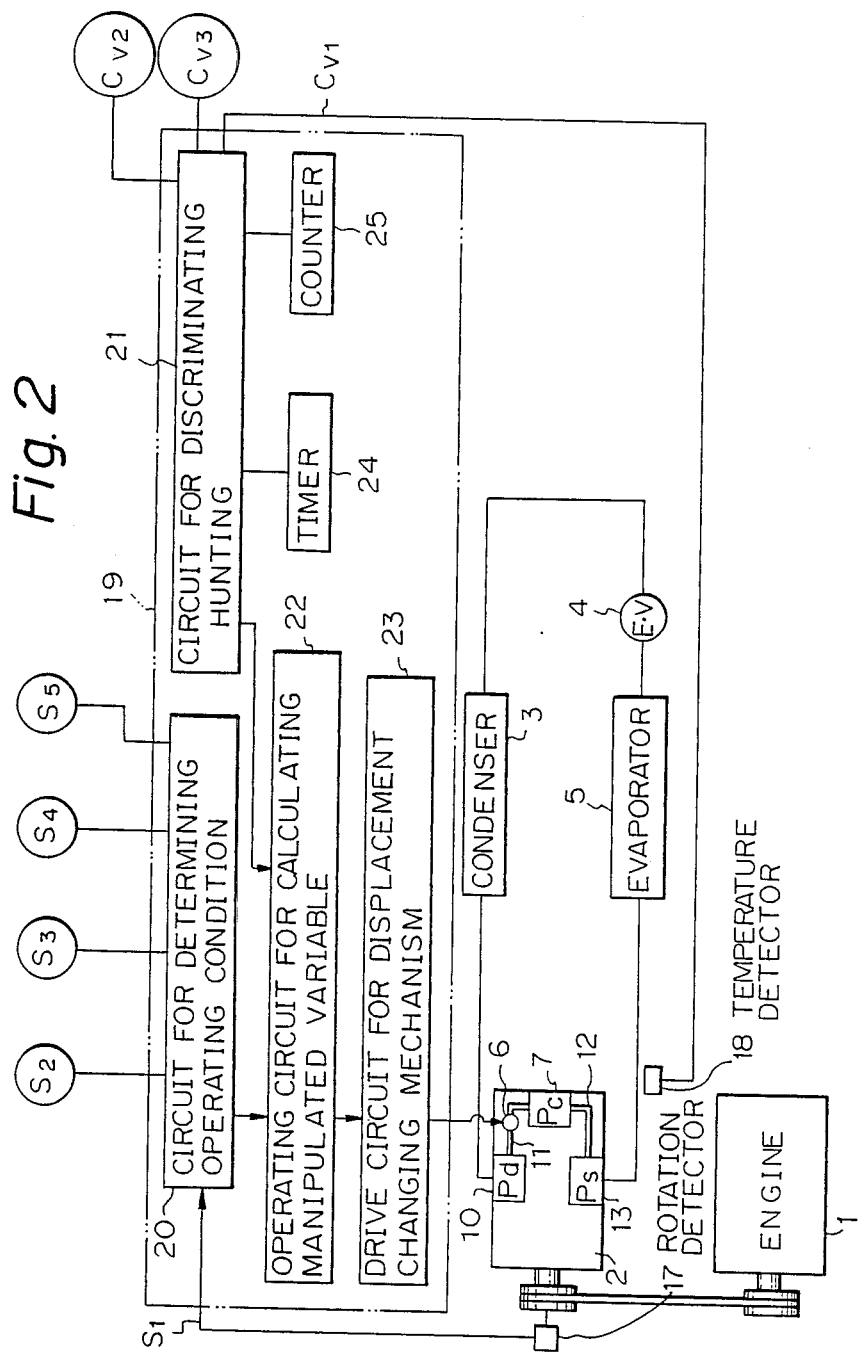
FIG. 2 is a schematic block diagram illustrating a closed refrigerant circuit of a car air-conditioner to which the controlling method according to the present invention is applied, and a circuit arrangement of a control means for a variable displacement type compressor of the air-conditioner.
Figure 6:
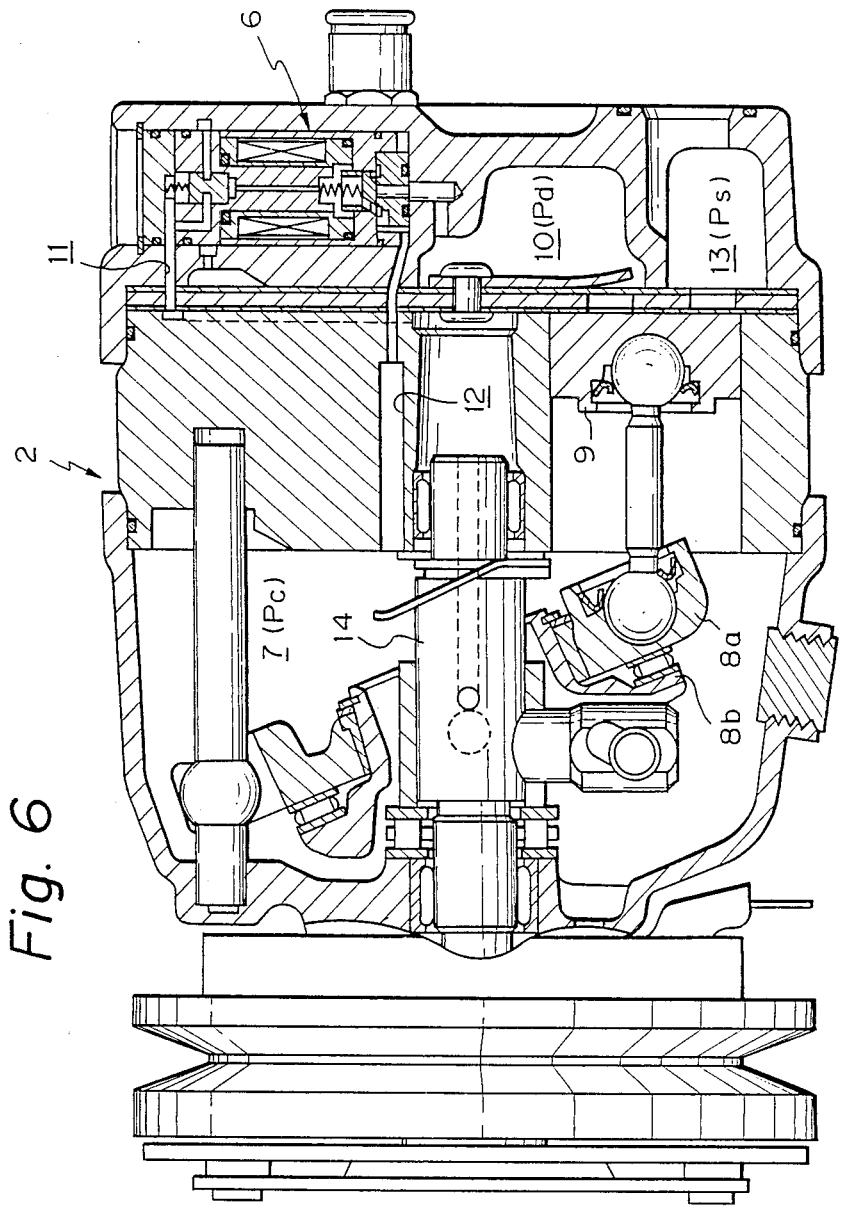
FIG. 6 is a longitudinal cross-sectional view of a variable displacement wobble plate type refrigerant compressor for use in a car air-conditioner; and, FIG. 7 is a flow chart illustrating the conventional control method of a variable displacement type compressor of a car air-conditioner.
Figure 7:
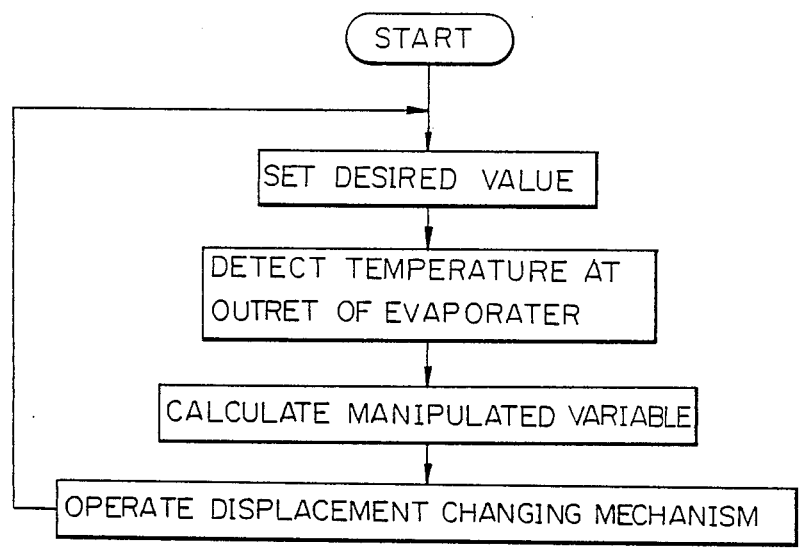

Referring to FIG. 2, a car air-conditioner has a closed refrigerant circuit in which a variable displacement type refrigerant compressor 2, e.g., a variable displacement wobble plate type compressor driven by a car engine 1, a refrigerant condenser 3, an expansion valve 4, and an evaporator 5 are serially arranged. The refrigerant condensor 3 connected to the delivery end of the compressor 2 condensates the compressed refrigerant from the compressor 2 and sends the refrigerant after condensation to the expansion valve 4. The refrigerant passing through the expansion valve 4 is then sent to the evaporator 5 to cool air for air-conditioning the passenger compartment of a car. After cooling the air, the refrigerant is returned to the suction end of the compressor 2. As best illustrated in FIG. 6, the variable displacement wobble plate type compressor 2 is provided with a wobble plate-operated piston mechanism to compress a refrigerant gas and a solenoid-operated control valve 6 functioning as a displacement changing mechanism of the compressor 2. Namely, the solenoid-operated control valve 6 is operated to control a pressure Pc in a crankcase chamber 7 in which the assembly of the non-rotary wobble plate 8a and a rotary drive plate 8b rotated by a drive shaft 14 is arranged. Due to the control of the pressure Pc in the crankcase chamber 7, the angle of inclination of the wobble plate 8a from a position vertical to the axis of the drive shaft 14 is adjustably changed, and therefore, the stroke of each of a plurality of pistons 9 is changed, and as a result, the displacement or the delivery capacity of the compressor is changed. The solenoid-operated control valve 6 comprises a valve element movable to open and close a refrigerant passageway 11 between a discharge chamber 10 and the crankcase chamber 7, and a solenoid element operable to electro-magnetically move the valve element between the opening and closing positions upon being electrically energized and de-energized. Opening and closing of the refrigerant passageway 11 enable the amount of a high pressure refrigerant gas (pressure level : Pd) flowing from the discharge chamber 10 to the crankcase chamber 7 to be controlled, to thereby achieve the above-mentioned control of the pressure level Pc in the crankcase chamber 7. The energization and de-energization of the solenoid element of the solenoid-operated control valve 6 is conducted by controlling the duty ratio of an electric excitation current supplied to the solenoid element. Note, reference is herewith made to the afore-mentioned allowed U.S. patent application Ser. No. 093,797 filed on Sept. 4, 1987, with respect to the duty ratio control of the solenoid-operated control valve of the variable displacement wobble plate type compressor.

The afore-mentioned crankcase chamber 7 is always in fluid communication with a suction chamber 13 (pressure level : Ps), through a passageway 12, and therefore, a blow-by gas from compression chambers to the crankcase chamber 7 is permitted to flow toward the suction chamber 13, and thus an uncontrolled rise in the pressure level in the crankcase chamber 7 is prevented.

As illustrated in FIG. 2, a rotation sensor 17 is disposed to detect the rotation of the drive shaft 14 of the compressor 2, and the detected signal $S_1$ indicating the operating condition of the compressor 2 is sent to a later-described control means 19 arranged for controlling the displacement of the compressor by controlling the operation of the solenoid-operated control valve 6, i.e., the displacement changing mechanism of the compressor 2. A temperature sensor 18 is disposed to detect the temperature at an outlet of the evaporator 5, and the detected signal $Cv_1$ indicating a cooling load or a controlled variable of the air-conditioner is also sent to the control means 19. The control means 19 of the air-conditioner comprises an operating condition determining circuit 20 for determining the operating condition of the compressor 2, a hunting discriminating circuit 21 for discriminating whether or not a hunting of a controlled variable of the air-conditioner has occurred, and operating circuit 22 for calculating a manipulated variable to be applied to the displacement changing mechanism, i.e., the solenoid-operated control valve 6, and a drive circuit 23 for driving the displacement changing mechanism of the air-conditioner. The afore-mentioned signal $S_1$ and the other signals $S_2$ through $S_5$ used for determining whether or not the operating condition of the compressor 2 is stable are input to the operating condition determining circuit 20. These signals $S_2$ through $S_5$ can indicate a temperature of the outer atmosphere of the passenger compartment of the car, the amount of the sunshine received by the car, a temperature at the inlet end of the evaporator 5, and an electric voltage applied to a blower fan of the evaporator. The afore-mentioned signal $Cv_1$ and the other signals $Cv_2$ and $Cv_3$ used for discriminating whether or not a hunting of a controlled variable of the air-conditioner has occurred are input to the hunting discriminating circuit 21. The operating condition determining circuit 20 and the hunting discriminating circuit 21 are connected to the operating circuit 22, wherein a calculation of a manipulated variable of the displacement changing mechanism is carried out on the basis of the outputs from the circuits 20 and 21. The manipulated variable calculated by the operating circuit 22 is supplied to the drive circuit 23, which generates electric signals to control the duty ratio of the electric current of the solenoid-operated control valve 6. The control means 19 also includes a later-described timer circuit 24 and a counter circuit 25, which are connected to the hunting discriminating circuit 21, and a non-illustrated setting device connected to the operating circuit 22 for setting the circuit 22 to a desired control value, i.e., a desired temperature of the car compartment.

The control means 19 controls the displacement of the compressor 2 so that the controlled variable of the air-conditioner indicated by at least one of the above-mentioned signals $Cv_1$ through $Cv_3$ approaches the desired value without the occurrence of hunting. At this stage, the discrimination of the hunting of the controlled variable is conducted by the hunting discriminating circuit 21 according to one of the two methods described hereinbelow.

Figure 3:
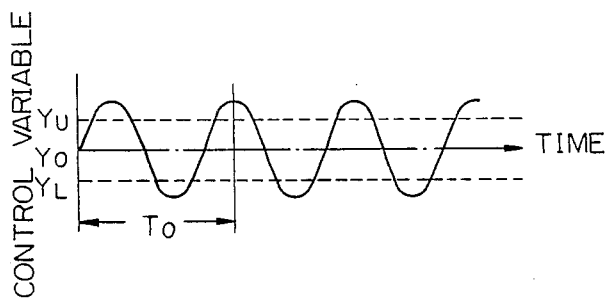
FIGS. 3 and 4 are graphical views of the hunting of a controlled variable of the air-conditioner.

Namely, in one method, the timer circuit 24 of the control means 19 is used for setting a predetermined time period $T_0$ in the hunting discriminating circuit 21, and then the signal $Cv_1$ detected by the temperature sensor 18 and supplied to the hunting discriminating circuit 21 is monitored by the circuit 21 to determine whether the signal $Cv_1$ exceeds a predetermined upper limit value Yu and a predetermined lower limit value Y1, which are predetermined with respect to the desired controlled variable $Y_0$ as illustrated in FIG. 3. Accordingly, when the signal $Cv_1$ exceeds the upper and lower limit values Yu and Y1, the number of times the limit values Yu and Y1 and exceeded by the signal $Cv_1$ during the predetermined time period $T_0$ set by the timer circuit 24 is counted by the counter 25, and as a result, when it is discriminated by the circuit 21 that the counted number of the counter circuit 25 is larger than a predetermined number set in the counter circuit 25, the hunting discriminating circuit 21 determines that hunting is occurring in the controlled variable of the air-conditioner.

Figure 4:
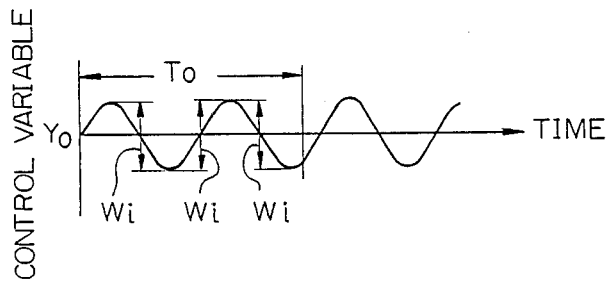

In the other method, as illustrated in FIG. 4, the width Wi of variation in the controlled variable (the signal $Cv_1$) of the temperature sensor 18 during a predetermined time period $T_0$ set by the timer circuit 24 is calculated by the hunting discriminating circuit 21, which discriminates whether or not the calculated width Wi of the controlled variable exceeds a predetermined width $W_0$, and the number of times that the width Wi of the controlled variable exceeds the predetermined width $W_0$ is counted by the counter circuit 25. When the counted number of the counter circuit 25 is larger than a predetermined number, the hunting discriminating circuit 21 determines that hunting is occurring in the controlled variable of the air-conditioner.

The above-mentioned hunting discriminating methods can be also carried out by the employment of the other signals $Cv_2$ and $Cv_3$.

The control method of the variable displacement wobble plate type compressor will be described below.

It is assumed that, since the temperature in the passenger compartment of a car is high, it is necessary to carry out an air-conditioning operation to cool the compartment. Accordingly, the compressor 2 is connected to the car engine 1 by a not-illustrated solenoid clutch so that the drive shaft 14 of the compressor 2 is rotated by the engine 1. Therefore, in the compressor 2, compression of the refrigerant gas is started by the reciprocation of the pistons 9 in the compression chambers of the compressor 2, and the compressed refrigerant gas is delivered from the discharge chamber 10 of the compressor 2 toward the closed refrigerant circuit of the air-conditioner. Namely, the compressed refrigerant is sent through the condenser 3 and the expansion valve 4 to the evaporator 5, where a heat exchange is carried out between the refrigerant gas and the air, and thereafter, the refrigerant gas is returned to the suction chamber 13 of the compressor 2.

Figure 1B:
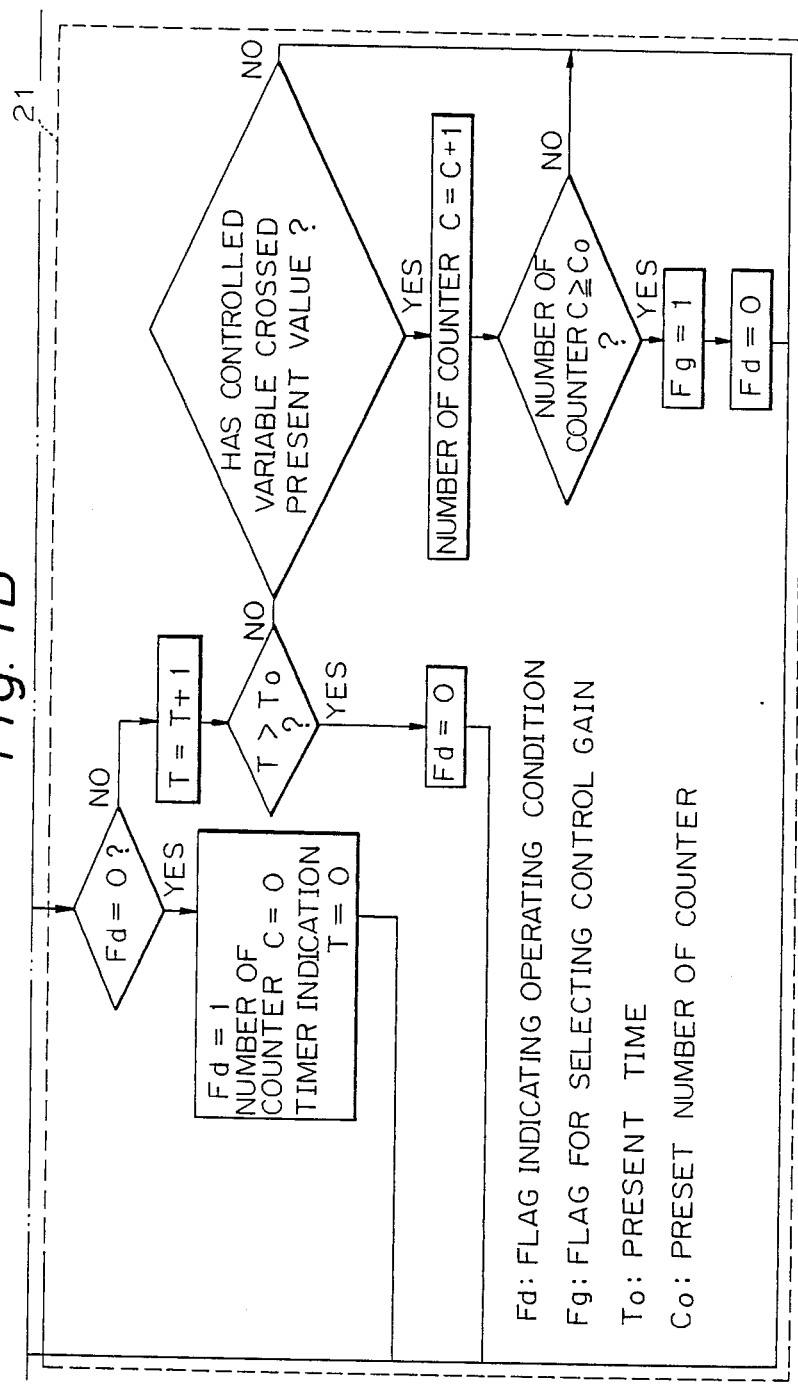
FIG. 1 is a flow chart of the operation of a control means of a car air-conditioner provided with a variable displacement type refrigerant compressor having a displacement changing mechanism, illustrating a controlling method according to an embodiment of the present invention.

Referring to FIGS. 1 and 2, when the operation of the air-conditioner is begun by the operation of the above-mentioned solenoid clutch to connect the compressor 2 to the car engine 1, the flags Fd and Fg stored in the memory of the operating circuit 22 and indicating the operating condition of the compressor 2 and the selection of a control gain, respectively, are both made 0 (Fd=0; Fg=0). Also, a desired value for the controlled variable of the air-conditioner is set by the setting device to the operating circuit 21. Accordingly, the compressor 2 delivers the compressed refrigerant gas to the closed circuit of the air-conditioner, the air in the passenger compartment of the car is cooled, and the temperature in the compartment is gradually lowered until the controlled variable approaches the desired value. While the compressor 2 is operating, the operating condition of the compressor 2 is constantly monitored by the rotation sensor 17, and the temperature at the outlet end of the evaporator 5 is constantly detected by the temperature detector 5. Subsequently, the operating circuit 22 of the control means 19 discriminates whether or not the flag Fg for selecting a control gain is 0. Since the Flag Fg is initially set at 0, the operating circuit 22 immediately carries out a calculation to obtain a manipulated variable $G_0$ for the compressor 2, by using a preset control gain, and accordingly, the manipulated variable $G_0$ is supplied to the drive circuit 23, to thereby produce an electric drive signal for electrically driving the displacement changing mechanism of the compressor 2. The electric drive signal is, in practice, an electric control signal changing the duty ratio of the electric excitating current supplied to the solenoid-operated control valve 6, to thereby control the displacement of the compressor 2.

Thereafter, when, for example, the rotating speed of the drive shaft 14 of the compressor 2 is rapidly increased due to an sudden acceleration of the car engine 1, the operating condition of the compressor 2 is unstable. Accordingly, the rotation sensor 17 detects the quick increase of the rotating speed of the drive shaft 14 and feeds back the detected signal $S_1$ to the control means 19, whereby the operation of the control means 19 is returned to the initial stage of detecting the operation condition of the compressor 2 on the basis of the detected signal $S_1$.

Conversely, when the rotating speed of the compressor drive shaft 14 is constant due to the constant high speed running of the car engine 1, the operating condition of the compressor 2 is stable. Then, the hunting discriminating circuit 21 discriminates whether or not the flag Fd indicating the operating condition of the compressor 2 is 0. As the flag Fd is initially made 0, as soon as the flag Fd is set to 1, the timer circuit 24 and the counter circuit 25 are simultaneously set to 0, respectively, the operation of the control means 19 is returned to the initial stage of detecting the operating condition of the compressor 2, and thus the above-mentioned operation of the control means 19 is again processed.

When the operating condition of the compressor 2 is stable thereafter, the flag Fd indicating the operating condition of the compressor 2 becomes 1, the number counted by the timer circuit 24 increases, and the hunting discriminating circuit 21 discriminates whether or not the controlled variable has crossed the upper limit value Yu and the lower limit value Yl as shown in FIG. 3. If NO, the operation of the control means 19 is returned to the initial stage of detecting the operating condition of the compressor 2, but if YES, the counter circuit 25 counts the number of times the controlled variable has crossed during the preset time period $T_0$, and then a discrimination is made of whether or not the counted number C during the preset time period $T_0$ is larger than the preset number $C_0$. If NO, no hunting has occurred in the controlled variable, and the operation of the control means 19 is again returned to the initial stage of detecting the operating condition of the compressor 2. But if YES, the flag Fg for selecting the control gain is set from 0 to 1, and the flag Fd indicating the operating condition of the compressor 2 is set from 1 to 0.

Figure 5:
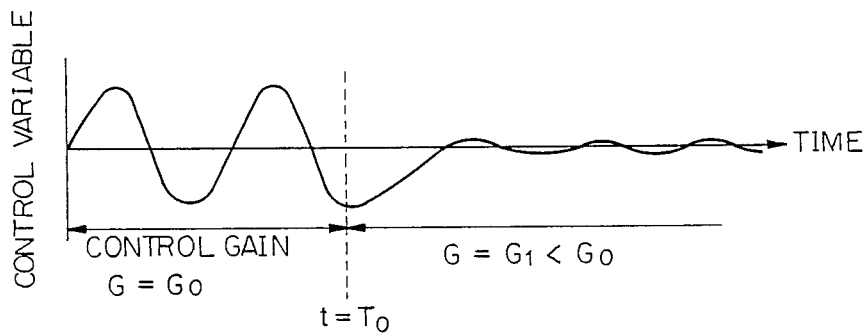
FIG. 5 is a graphical view illustrating an occurrence of the hunting of a controlled variable of the air-conditioner and a suppressed state of the hunting.

Thereafter, the control means 19 detects the operating condition of the compressor 2 and the temperature at the outlet of the evaporator 5, and a discrimination is made of whether or not the flag Fg is 0. At this stage, since the flag Fg has already become 1, the control gain is corrected and reduced, and thus the manipulated variable $G_1$ for the compressor 2 is reduced. As a result, as illustrated in FIG. 5, the hunting of the controlled variable of the air-conditioner is suppressed after the preset time period $T_0$. When the counting time counted by the timer circuit 24 exceeds the preset time period $T_0$, the flag Fd indicating the operating condition of the compressor 2 is set from 0 to 1, regardless of any correction of the control gain, and the next operation is carried out.

From the above-described operation of the control means 19, it will be understood that, according to the described method for controlling the variable displacement wobble plate type compressor, when the operating condition of the compressor is stable, and when hunting of a controlled variable of the air-conditioner appears, a control gain is reduced so that a manipulated variable to be given to the displacement changing mechanism of the compressor is rapidly reduced. As a result, the hunting of the controlled variable of the air-conditioner can be rapidly suppressed, i.e., a temperature variation at the outlet end of the evaporator 5 can be quickly prevented. Therefore, the temperature in the passenger compartment can be maintained at a desired value, and accordingly, the passenger in the car always feel comfortable. Further, the method of reducing the manipulated variable given to the displacement changing mechanism of the compressor contributes to a suppression of a noisy buzzing sound of the compressor caused by a change in the compressor displacement. Moreover, according to the controlling method of the present invention, it is not necessary to set many different control gains in the operating circuit for calculating the manipulated variable for the compressor, and therefore, the capacity of a memory for storing the control gains can be reduced, and thus the cost of manufacturing the control means can be reduced.

We claim:

1. A method for controlling the operation of a variable displacement type refrigerant compressor provided with a displacement changing mechanism and arranged in a closed refrigerant circuit of a car air-conditioner including a refrigerant gas condenser connected to a delivery side of the compressor, an expansion valve connected to the refrigerant gas condenser, an evaporator connected to the expansion valve and to a suction side of the compressor, and a control means operatively connected to the displacement changing mechanism of the compressor for controlling the displacement changing mechanism to thereby adjust a controlled variable of the car air-conditioner, comprising the steps of:

detecting a physical variable indicating an operating condition of the air-conditioner;

detecting a change in the controlled variable of the air-conditioner;

determining whether or not the operating condition of the air-conditioner is stable on the basis of said detected physical variable;

discriminating whether or not hunting of the controlled variable appears from the detected change in the controlled variable when it is determined that the operating condition of the air-conditioner is stable; and adjusting a manipulated variable of the control means to be given to the displacement changing mechanism of the compressor so that the displacement changing mechanism of the compressor is driven to suppress hunting of the controlled variable of the air-conditioner when an appearance of hunting of the controlled variable is detected by said discriminating step.

2. A method for controlling the operation of a variable displacement type refrigerant compressor according to claim 1, wherein said displacement changing mechanism of the compressor comprises a solenoid-operated control valve for changing the angle of the wobble plate of said compressor.

3. A method for controlling the operation of a variable displacement type refrigerant compressor according to claim 1, wherein said physical variable indicating an operating condition of the air-conditioner comprises the rotating speed of the compressor, a temperature of the outer atmosphere of the car, the amount of sunshine, a temperature at an inlet end of the evaporator, and an electric voltage of a blower fan attached to the evaporator, and wherein said controlled variable of the air-conditioner comprises at least one of a temperature at an outlet end of the evaporator, a temperature at an outlet of a duct from which cooled air is delivered, and a temperature in a compartment of a car.

4. A method for controlling the operation of a variable displacement type refrigerant compressor according to claim 3, wherein said controlled variable of the air-conditioner comprises a temperature detected at an outlet end of the evaporator, and wherein the step of discrimination of said hunting of the controlled variable comprises:

discriminating whether or not said temperature detected at the outlet of the evaporator exceeds predetermined upper and lower limit values which are selected with respect to a desired value of said controlled variable, during a preset time period set by a timer means;

counting the number of times that said detected temperature crosses said upper and lower limit values during said preset time period, by a counter means; and, determining that hunting of the controlled variable is occurring when the counted number exceeds a predetermined counting number.

5. A method for controlling the operation of a variable displacement type refrigerant compressor according to claim 3, wherein said controlled variable of the air-conditioner comprises a temperature detected at an outlet end of the evaporator, and wherein the step of discrimination of said hunting of the controlled variable comprises:

calculating a width of variation in the temperature detected at an outlet end of the evaporator during a predetermined time period;

counting the number of times that the calculated width exceeds a predetermined width, by a counter means; and, determining that hunting of the controlled variable is occurring when the counted number exceeds a predetermined counting number.

* * * * *